Nov. 5, 1929.  J. C. CARNER  1,734,074
SHUT-OFF DEVICE
Filed June 30, 1928

Jefferson C. Carner
Inventor
By C.A.Snow&Co.
Attorneys.

Patented Nov. 5, 1929

1,734,074

UNITED STATES PATENT OFFICE

JEFFERSON C. CARNER, OF MARIETTA, OHIO

SHUT-OFF DEVICE

Application filed June 30, 1928. Serial No. 289,458.

This invention aims to provide a simple cut off device or valve so constructed that it will require no packing of any kind to prevent leakage, novel means being supplied for lubricating the rotary member.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Figure 1:
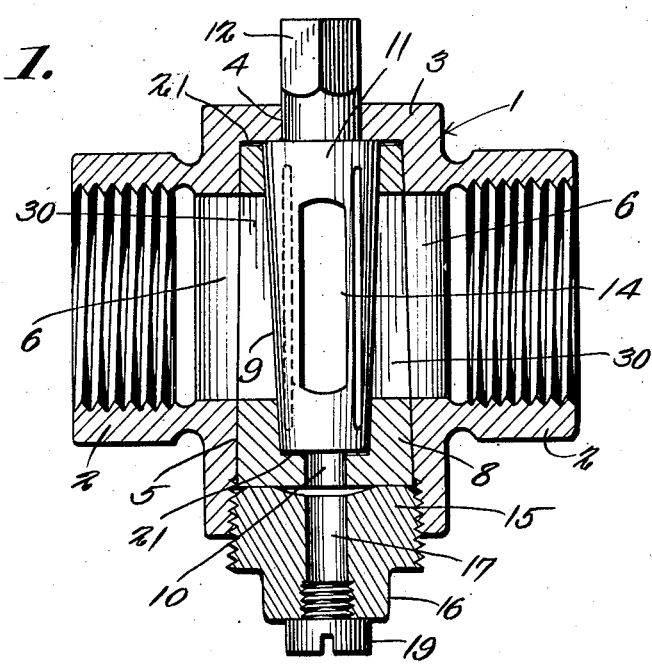
Figure 2:
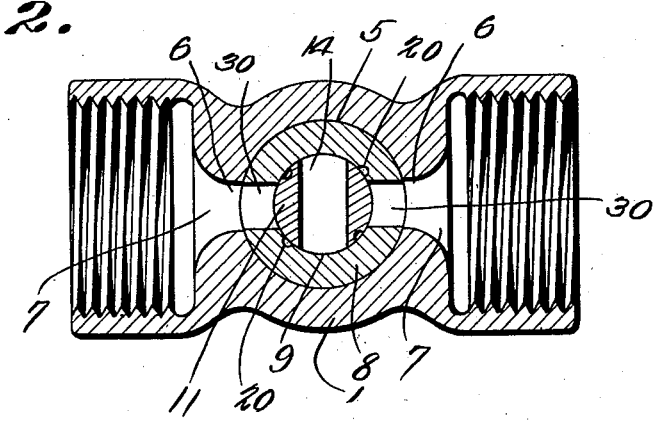

Figure 1 shows in vertical longitudinal section, a device constructed in accordance with the invention; and Figure 2 is a horizontal longitudinal section of the structure shown in Figure 1.

The device forming the subject matter of this application preferably is made of metal throughout and includes a body 1 provided with oppositely disposed nipple 2. The body 1 is supplied at one extremity with an end wall 3 in which there is a reduced opening 4. The body 1 has a tapered bore 5, and there are elongated openings 6 in the body, the openings communicating with the bore 5 and with the nipples 2, the openings 6 being flared as shown at 7 in Figure 2, where they communicate with the nipples 2.

A tapered sleeve 8 is engaged tightly in the tapered bore 5 of the body 1. The sleeve 8 has a tapered bore 9. The bore 9 is tapered in one direction, and the bore 5 is tapered in the opposite direction. The sleeve 8 is supplied with oppositely disposed openings 30 which register with the openings 6 in the body 1. In the lower or wider end of the sleeve 8 there is a reduced opening 10 which communicates with the lower end of the bore 9.

A tapered valve 11 fits tightly but for rotation in the bore 9 of the sleeve 8 and has a stem 12 whereby the valve may be rotated, the stem extending outwardly through the opening 4 in the upper end of the body 1. The sleeve 8 is supplied with superficial longitudinal grooves 20 in which a lubricant (not shown) is placed before the device is assembled. The lubricant will last for a long time and facilitates the rotation of the valve 11 in the sleeve 8. The valve 11 has an elongated transverse port 14 adapted to be brought into and out of registration with the openings 30 of the sleeve 8 when the valve 11 is rotated by means of the stem 12.

A pressure member 15 is threaded into the lower end of the body 1 and is supplied at its lower end with a wrench head 16, by which the pressure member may be rotated conveniently. The pressure member 15 has an axial opening 17 alined with the opening 10 in the lower end of the sleeve 8. There is a depression 18 in the inner end of the pressure member 15, and this depression forms a rim which bears against the lower end of the sleeve 8 at the outer edge of the sleeve and secures an even advance of the sleeve when the pressure member 15 is turned into the body 1, as and for a purpose which will be set forth hereinafter. A closure plug 19 is threaded into the lower end of the opening 17 in the member 15. As shown at 21, there is a slight space between the upper end of the sleeve 8 and the end wall 3, and there is a slight space between the lower end of the valve 11 and the bottom of the bore 9 of the sleeve 8. This is to permit a take-up or adjustment when the pressure member 15 is advanced.

The pressure member 15 may be rotated by means of the wrench head 16, and when the pressure member 15 is advanced, it will shove the sleeve 8 upwardly and engage the sleeve tightly in the bore 5. The upper end of the valve 11 bears against the end wall 3 of the body 1, and when the sleeve 8 is shoved upwardly, as aforesaid, the valve 11 will be engaged the more tightly in the bore 9 of the sleeve 8. The construction of the device is such that there will be no occasion for packings of any kind. When liquid which may happen to leak downwardly, after a long time, in the bore 5, or in the bore 9, will accumulate in the opening or passage 17, from which it may be drawn off by removing the plug 19.

What is claimed:—

In a device of the class described, a body having an integral end wall and provided with a tapered bore, the smaller end of the bore being at the end wall, a tapered sleeve engaged tightly in the bore of the body and having a bore which tapers oppositely to the bore of the sleeve, a tapered valve engaged tightly but rotatably in the bore of the sleeve and having an operating stem extended outwardly through the integral end wall of the body, a pressure member threaded into the body, the pressure member being disposed opposite to the aforesaid end wall and engaging one end of the sleeve, the pressure member and the sleeve having cooperating drainage passages, and a closure for the drainage passage of the pressure member.

In testimony that I claim the foregoing as my own, I have hereto affixed my signature.

JEFFERSON C. CARNER.